United States Patent
Subramanyam et al.

(10) Patent No.: US 11,977,914 B2
(45) Date of Patent: May 7, 2024

(54) SCHEDULING RESOURCE RESERVATIONS IN A CLOUD-BASED COMMUNICATION SYSTEM

(71) Applicant: MOTOROLA SOLUTIONS, INC., Chicago, IL (US)

(72) Inventors: Srividya G. Subramanyam, South Barrington, IL (US); Madhusudan Pai, Frisco, TX (US); Yunhai Yang, Elgin, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 372 days.

(21) Appl. No.: 17/136,825

(22) Filed: Dec. 29, 2020

(65) Prior Publication Data
US 2022/0206844 A1    Jun. 30, 2022

(51) Int. Cl.
*G06F 9/46* (2006.01)
*G06F 9/455* (2018.01)
*G06F 9/48* (2006.01)
*G06F 9/50* (2006.01)

(52) U.S. Cl.
CPC ........ *G06F 9/4881* (2013.01); *G06F 9/45558* (2013.01); *G06F 9/5072* (2013.01); *G06F 9/5077* (2013.01); *G06F 9/5083* (2013.01); G06F 2009/4557 (2013.01); G06F 2209/5014 (2013.01); G06F 2209/508 (2013.01)

(58) Field of Classification Search
CPC .................................................. G06F 9/4881
USPC ......................................................... 718/104
See application file for complete search history.

(56) References Cited

U.S. PATENT DOCUMENTS 8,555,286 B2 * 10/2013 Flores ...................... G06F 9/50
                                                     718/104
9,148,771 B2 *  9/2015 Zentner .................. H04W 4/90
9,344,571 B2 *  5/2016 Tang .................... H05K 999/99
(Continued)

FOREIGN PATENT DOCUMENTS

CN     104065663 A    9/2014
CN     104618269 A    5/2015
(Continued)

OTHER PUBLICATIONS

Keda, "Kubernetes Event-driven Autoscaling," <https://keda.sh/> web page publicly available at least as early as Oct. 6, 2020.
(Continued)

*Primary Examiner* — Mehran Kamran
(74) *Attorney, Agent, or Firm* — Michael Best & Friedrich LLP

(57) ABSTRACT

Scheduling resource reservations in a cloud based communications system. One embodiment provides a scheduling server for scheduling resource reservation in a cloud-based communication system. The scheduling server includes an electronic processor configured to monitor events outside of the cloud-based communication system to determine an occurrence of an incident and determine cloud computing resources to be allocated to consuming communication devices assigned to respond to the incident. The electronic processor is also configured to reserve the cloud computing resources such that the cloud computing resources are available to the consuming communication devices for responding to the incident.

16 Claims, 3 Drawing Sheets

(56) References Cited

U.S. PATENT DOCUMENTS

| | | | |
|---|---|---|---|
| 9,448,824 B1* | 9/2016 | Fitzgerald | G06F 9/5083 |
| 9,563,479 B2* | 2/2017 | Ferris | G06F 9/5072 |
| 11,134,013 B1* | 9/2021 | Allen | G06F 9/5072 |
| 11,216,783 B2* | 1/2022 | Schuler | G06Q 10/10 |
| 11,372,689 B1* | 6/2022 | Allen | G06F 9/4887 |
| 2007/0280430 A1* | 12/2007 | He | H04L 47/724 379/37 |
| 2008/0008090 A1* | 1/2008 | Gilfix | H04L 47/782 370/230 |
| 2011/0016214 A1* | 1/2011 | Jackson | G06F 9/505 718/101 |
| 2011/0053553 A1* | 3/2011 | Lambert | H04W 16/00 455/404.2 |
| 2011/0138051 A1* | 6/2011 | Dawson | G06F 9/5072 709/226 |
| 2012/0179824 A1* | 7/2012 | Jackson | H04L 47/827 709/226 |
| 2014/0095630 A1* | 4/2014 | Wohlert | H04W 4/08 709/206 |
| 2014/0248891 A1* | 9/2014 | Sennett | G06F 16/00 455/452.1 |
| 2014/0258546 A1* | 9/2014 | Janssens | G06F 9/505 709/226 |
| 2014/0282528 A1* | 9/2014 | Bugenhagen | G06F 11/30 718/1 |
| 2014/0329539 A1* | 11/2014 | Li | G01S 5/0284 455/456.1 |
| 2015/0067171 A1* | 3/2015 | Yum | H04L 67/562 709/226 |
| 2015/0229586 A1* | 8/2015 | Jackson | H04L 47/827 705/40 |
| 2015/0271092 A1* | 9/2015 | Ward, Jr. | G06F 9/452 709/226 |
| 2016/0021025 A1* | 1/2016 | Patel | H04L 47/822 370/329 |
| 2017/0111779 A1* | 4/2017 | Sennett | H04W 4/06 |
| 2018/0240163 A1* | 8/2018 | Sivasubramanian | H04M 15/805 |
| 2018/0301017 A1* | 10/2018 | Dizengof | G08B 25/016 |
| 2018/0302340 A1* | 10/2018 | Alvarez Callau | H04L 47/821 |
| 2018/0338346 A1* | 11/2018 | Routt | H04L 43/0876 |
| 2019/0089647 A1* | 3/2019 | Das | H04L 47/72 |
| 2019/0327179 A1* | 10/2019 | Millin | G06Q 10/06 |
| 2019/0342944 A1* | 11/2019 | Chatterjee | H04L 5/0082 |
| 2020/0136978 A1* | 4/2020 | Li | H04L 67/141 |
| 2020/0151841 A1* | 5/2020 | Schuler | G06Q 50/265 |
| 2020/0403930 A1* | 12/2020 | Das | H04L 47/72 |
| 2021/0152488 A1* | 5/2021 | Dey | H04M 15/853 |
| 2021/0311805 A1* | 10/2021 | Nakamura | G06F 9/4881 |
| 2021/0344744 A1* | 11/2021 | Shaw | H04L 67/52 |
| 2021/0406074 A1* | 12/2021 | Keller | G06F 9/5077 |
| 2022/0191672 A1* | 6/2022 | Dizengof | H04W 76/50 |
| 2022/0206844 A1* | 6/2022 | Subramanyam | G06F 9/4881 |

FOREIGN PATENT DOCUMENTS

| | | |
|---|---|---|
| EP | 3367240 A1 | 8/2018 |
| RU | 2609076 C2 | 1/2017 |
| WO | 2021246881 A1 | 12/2021 |

OTHER PUBLICATIONS

Kubernetes, "Horizontal Pod Autoscaler," <https://kubernetes.io/docs/tasks/run-application/horizontal-pod-autoscale/> web page publicly available at least as early as Oct. 6, 2020.

Microsoft, "Autoscaling" <https://docs.microsoft.com/en-us/azure/architecture/best-practices/auto-scaling> web page publicly available at least as early as Oct. 6, 2020.

Microsoft, "Container Instances," <https://azure.microsoft.com/en-us/services/container-instances/#overview> web page publicly available at least as early as Oct. 6, 2020.

\* cited by examiner

SCHEDULING RESOURCE RESERVATIONS IN A CLOUD-BASED COMMUNICATION SYSTEM

BACKGROUND OF THE INVENTION

Cloud computing provides computing services to organizations over the Internet. Cloud computing allows organizations to reduce their physical computing resources and achieve scalability based on the organization's needs. Cloud services providers maintain the physical infrastructure to support several organizations and are able to shift resources based on requests from the organizations. Cloud services are charged based on the amount of time a unit of resource is used or reserved for.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
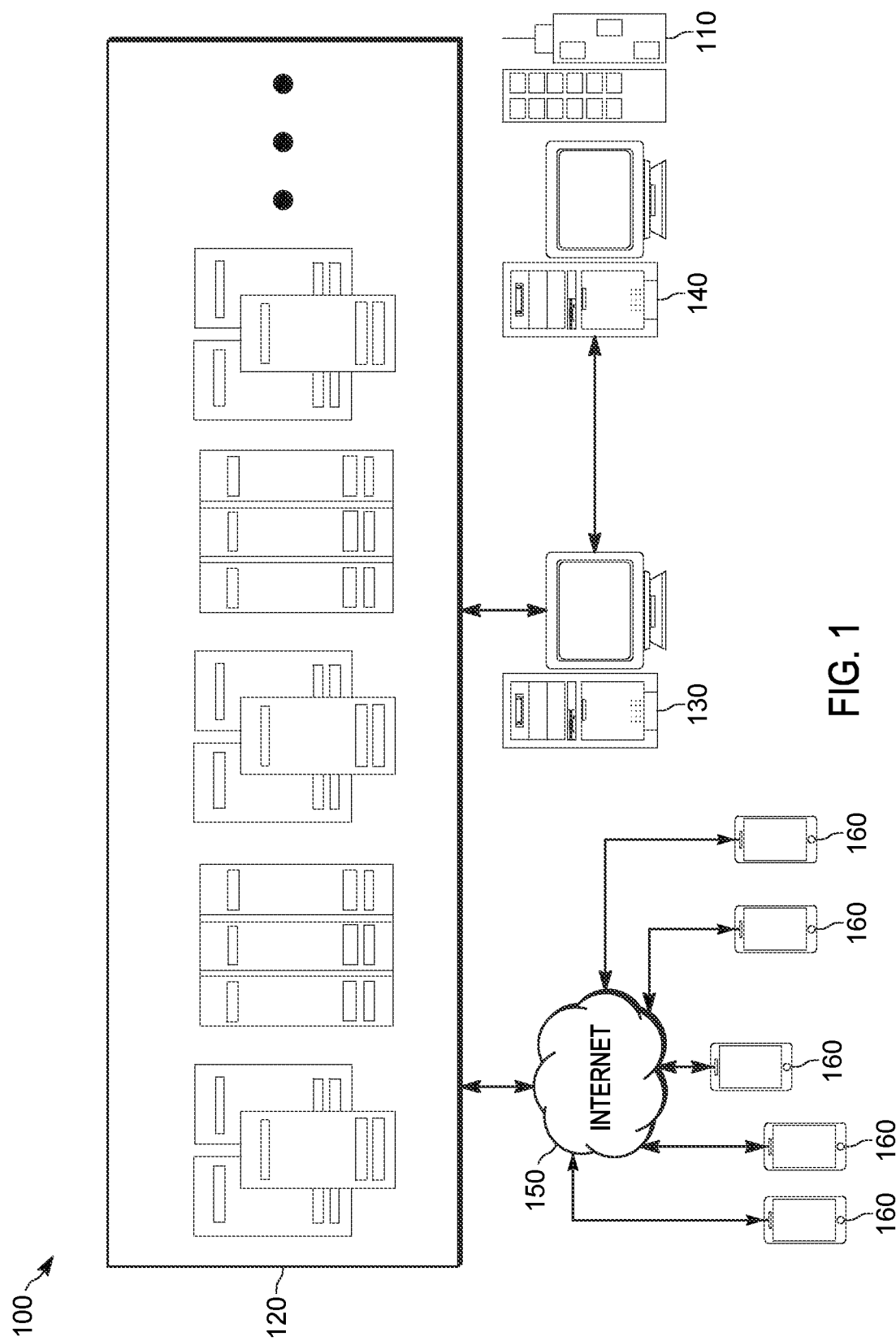
FIG. 1 is a block diagram of a cloud-based communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Public safety organizations, for example, police, fire, and emergency services organizations use cloud computing resources to implement communication systems. Cloud computing resources are used by communication devices of the organization when responding to a public safety incident. Public safety incidents may change in size overtime requiring more public safety officers to come on-board to help respond to the incident or freeing up some public safety officers who were previously responding to the incident. This change in the number of officers responding to the increases or decreases the demand of cloud services for responding to the incident.

Cloud service providers use automatic scaling (or auto-scaling) to address the changes in demand of cloud services. Auto-scaling includes monitoring current cloud utilization to increase or decrease the available resources for the remainder of the incident. These additional resources for the incident are provided on a best effort basis and are not guaranteed resources. Auto-scaling may fail due to unavailable capacity in the cloud computing instance or maximum resource limits of the cloud service being reached. However, for public safety incidents and mission critical events, it is important that the resources be available when needed.

Another solution for the changing demand is to reserve a maximum number of resources in advance for the duration of the incident such that the resources are guaranteed to be available. However, this significantly increases the costs of the public safety organizations.

Accordingly, there is a need for efficiently scheduling resources in a cloud-based communication system that allows for dynamic adjustment of guaranteed resources and optimizing the cost of operating the cloud service.

One embodiment provides a scheduling server for scheduling resource reservation in a cloud-based communication system. The scheduling server includes an electronic processor configured to monitor events outside of the cloud-based communication system to determine an occurrence of an incident and determine cloud computing resources to be allocated to consuming communication devices assigned to respond to the incident. The electronic processor is also configured to reserve the cloud computing resources such that the cloud computing resources are available to the consuming communication devices for responding to the incident.

Another embodiment provides a method for scheduling resource reservation in a cloud-based communication system. The method includes monitoring, using a scheduling server, events outside of the cloud-based communication system to determine an occurrence of an incident and determining, using the scheduling server, cloud computing resources to be allocated to consuming communication devices assigned to respond to the incident. The method also includes reserving, using the scheduling server, the cloud computing resources such that the cloud computing resources are available to the consuming communication devices for responding to the incident.

FIG. 1 illustrates an example cloud-based communication system 100. The system 100 includes features that, among other things, allow an enterprise 110 to schedule and use cloud computing resources 120 (also referred to as the cloud 120) provided by a cloud services provider 130. In certain examples provided, the enterprise 110 is a public safety organization, for example, a police department, a fire department, an emergency medical services agency, or similar entity. The enterprise 110 includes a scheduling server 140 to schedule and manage the cloud computing resources 120 for the enterprise 110. In some embodiments, the scheduling server 140 may also communicate with a scheduling server 140 of another enterprise 110 to share resources between the enterprises for the same incident or for different incidents at the same locations. Related enterprises 110 can therefore share resources. In one example, a police department shares resources with a fire department and/or an emergency medical services department.

The cloud computing resources 120 may include servers, virtual machines (VMs), storage, networks, operating systems and the like. The cloud computing resources 120 include virtualized instances, for example, virtual machines, docker containers, Kubernetes pods, and the like. The enterprise 110 may host operating infrastructure, application server, management servers, and the like of the enterprise 110 in the cloud computing resources 120. The enterprise 110 expands and contracts the resources available to the devices of the enterprise 110 based on demand.

The cloud computing resources 120 are managed by the cloud services provider 130. The cloud services provider 130 may be a commercial cloud services provider, for example, Amazon Web Services™, Microsoft Azure, Google Cloud, or the like. The cloud services provider 130 receives scheduling requests directly or over the Internet 150 from the scheduling server 140. The cloud services provider 130 manages availability of the cloud computing resources 120 based on the scheduling requests.

The cloud computing resources 120 are accessed by communication devices 160 when responding to a public safety incident. The communication devices 160 include, for example, mobile two-way radios, portable two-way radios, smart telephones, tablet computers, laptop computers, wearable devices (for example, body-worn cameras, smart watches), and the like. The communication devices 160 are assigned to users (for example, public safety officers) of the enterprise 110. The communication devices 160 access applications of the enterprise 110, for example, instant communication applications, voice services, video services, data communication services, e-mail application, database applications for state and/or federal databases, and the like that are hosted over the cloud computing resources 120. The number of cloud computing resources 120 available to support the communication devices 160 are increased and decreased based on the number of communication devices 160 responding to an incident. In some embodiments, the control of increasing and decreasing of cloud computing resources 120 is handled by the scheduling server 140. Specifically, the scheduling server 140 monitors events outside the cloud-based communications system to determine an occurrence of an incident. The scheduling server 140 determines cloud computing resources 120 to be allocated to consuming communication devices 160 assigned to respond to the incident based on the events outside the cloud-based communications system. The scheduling server 140 reserves the cloud computing resources 120 such that the cloud computing resources 120 are available to the consuming communication devices 160 for responding to the incident.

The communication devices 160 access the cloud computing resources 120 via the Internet 150. The communication devices 160 may connect to the Internet over one or more other networks, for example, a public communication network (for example, a cellphone network, a satellite network, and the like) or over a private communication network (for example, a private LTE, LMR, Wi-Fi, or other network) temporarily or permanently setup by the enterprise 110.

Figure 2:
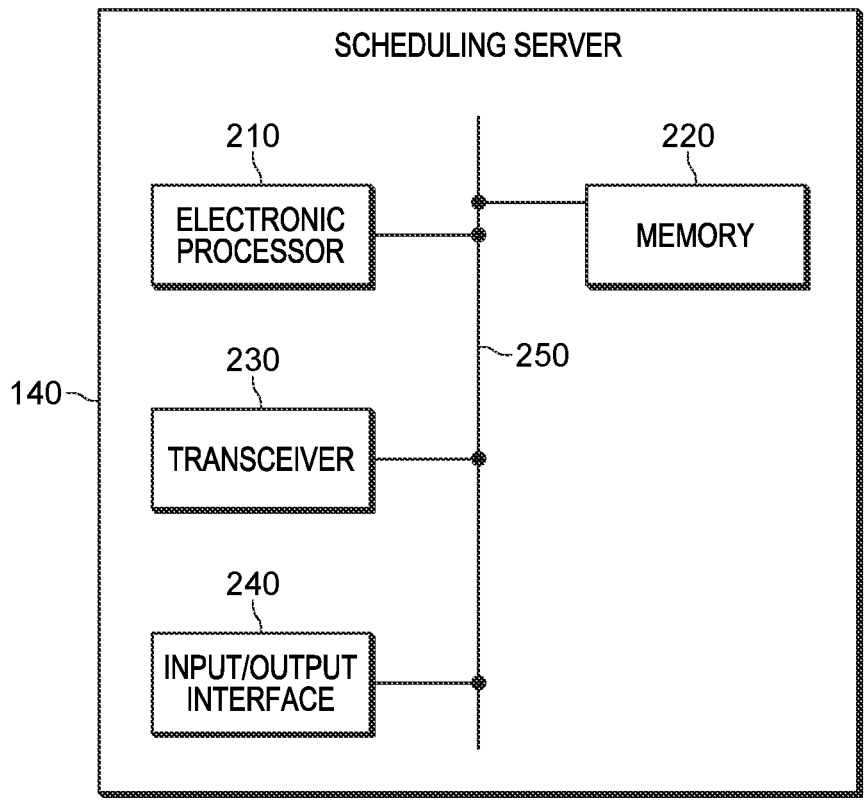
FIG. 2 is a block diagram of a scheduling server of the system of FIG. 1 in accordance with some embodiments.

FIG. 2 is a block diagram of one embodiment of the scheduling server 140. In the example illustrated, the scheduling server 140 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example embodiment of the scheduling server 140. The scheduling server 140 may include more or fewer components and may perform additional functions other than those described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be a special purpose processor designed to implement neural networks for machine learning. In other embodiments, the electronic processor 210 may be implemented using multiple processors. In addition, the electronic processor 210 may be implemented partially or entirely as, for example, a field programmable gate array (FPGA), an applications-specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the scheduling server 140 described herein. The memory 220 may include, for example, a program storage area and a data storage area. The program storage area and the data storage area may include combinations of different types of memory, such as read-only memory, and random-access memory and different types of cloud storage such as object storage, file storage, and/or combinations of object storage and file storage. In some embodiments, the scheduling server 140 may include one electronic processor 210 a plurality of electronic processors 210, for example, in a cluster arrangement, one or more of which may be executing none, all, or a portion of the applications of the scheduling server 140 described below, sequentially or in parallel across the one or more electronic processors 210. The one or more electronic processors 210 comprising the scheduling server 140 may be geographically co-located or may be geographically separated and interconnected via various network, electrical, and/or optical connections. One or more proxy servers or load balancing servers may control which one or more electronic processors 210 perform any part or all of the applications provided below. In some embodiments, orchestration mechanisms are employed by a cloud service to manage sets of resources desired for the cloud services.

The transceiver 230 enables wired and/or wireless communication between the scheduling server 140 and the cloud services provider 130 directly or over the Internet 150. The transceiver 230 also enables wired and/or wireless communication between the scheduling server 140 and a scheduling server 140 of a related enterprise 110. In some embodiments, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

In the example provided in FIG. 2, a single device is illustrated as including all the components and the applications of the scheduling server 140. However, it should be understood that one or more of the components and one or more of the applications may be combined or divided into separate software, firmware, and/or hardware. Regardless of how they are combined or divided, these components and applications may be executed on the same computing device or may be distributed among different computing devices connected by one or more networks or other suitable communication mechanisms.

As discussed above, the scheduling server 140 communicates with the cloud services provider 130 to allocate and/or reserve cloud computing resources 120 for use by the communication devices 160. Allocating cloud computing resources 120, however, does not guarantee that the resources are available when the communication device 160 is ready to use the cloud computing resources 120. On the other hand, reserving cloud computing resources 120 guarantees that the cloud computing resources 120 are available for use by the communication devices 160.

Reservations can be made in advance or on demand. Once the cloud computing resources 120 are reserved, the cloud computing resources 120 are guaranteed to be available for use at the time and location for the duration of the cloud computing resources 120 reservation. In public safety applications, determining when and how many resources are needed may be unpredictable. The number of responding communication devices 160 at a public safety incident are always changing. Auto-scaling may be used to adapt to the changing demands of a public safety incident in place of reservations. Auto-scaling includes constantly monitoring the load on the currently reserved cloud computing resources 120 to increase or decrease cloud computing resources 120. Auto-scaling allows for allocation of additional cloud computing resources 120 for the responding communication devices 160 at the incident. However, since these cloud computing resources 120 are not reserved, the cloud computing resources 120 may not be guaranteed to be available when needed by the communication devices 160. Additionally, auto-scaling only monitors events within the cloud, for example, current load, historical data regarding load usage, and the like to auto-scale the available cloud computing resources 120. However, real time public safety incidents are unpredictable and monitoring cloud resources does not provide sufficient information to change the amount of reservations for the communication devices 160 responding to the incident. Unlike the method of auto-scaling, scheduling resource reservations guarantees availability of the cloud computing resources 120.

Figure 3:
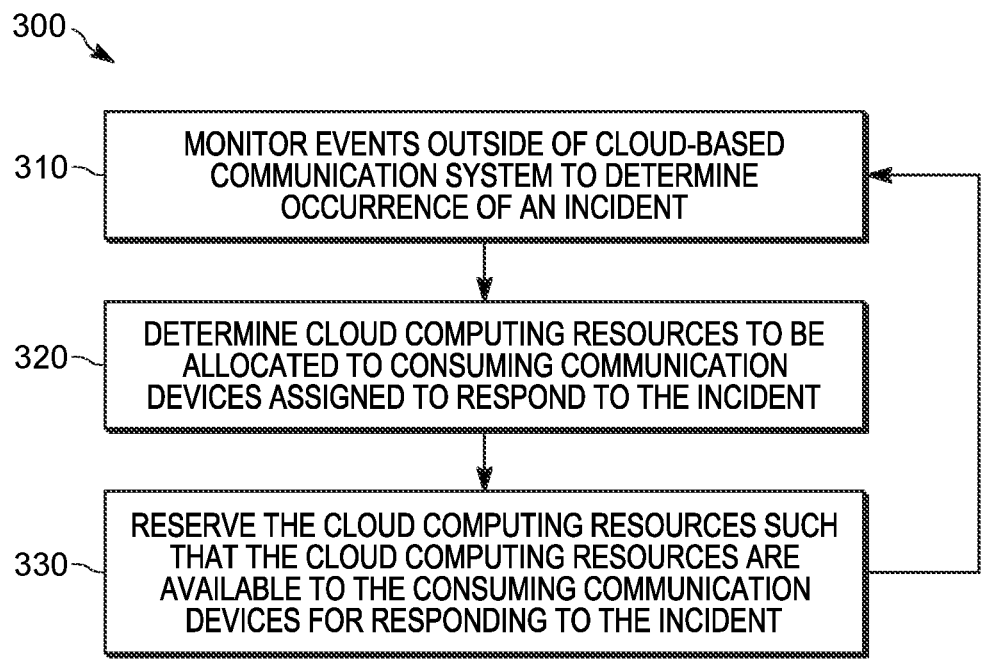
FIG. 3 is a flowchart of a method for scheduling resource reservations in the cloud-based communication system of FIG. 1 in accordance with some embodiments.

FIG. 3 is a flowchart of an example method 300 for scheduling resource reservation in the cloud-based communication system 100. In the example illustrated, the method 300 includes monitoring, using the electronic processor 210, events outside of the cloud-based communication system 100 to determine occurrence of an incident (at block 310). Events outside the cloud include, for example, monitoring police scanners, video surveillance feeds, and emergency calls for occurrence of incidents. The scheduling server 140 also monitors events during the occurrence of a public safety incident. The monitoring of events outside of the cloud-based communication system 100 can include monitoring video surveillance feeds and the audio over communication devices 160 during or before a public safety incident. The events monitored are outside of the cloud rather than monitoring the current load or historical data of the cloud for similar events. Monitoring may also be based on inputs provided to the scheduling server 140 by a user of the scheduling server 140. Based on the monitored events, the electronic processor 210 determines an occurrence of an incident, for example, a public safety incident (for example, a fire, a crash, or the like).

The method 300 includes determining, using the electronic processor 210, cloud computing resources 120 to be allocated to consuming communication devices 160 assigned to respond to the incident (at block 320). When it is determined that an incident is occurring, the scheduling server 140 may assign a number of public safety officers to the incident. Each public safety officer may be associated with one or more communication devices 160. The communication devices 160 of the responding public safety officers responding to the incident are the consuming communication devices 160 assigned to respond to the incident.

The method 300 includes reserving, using the electronic processor 210, the cloud computing resources 120 such that the cloud computing resources 120 are available to the consuming communication devices 160 for responding to the incident (at block 330). The scheduling server 140 communicates with the cloud services provider 130 to reserve the cloud computing resources 120. The reservation of the cloud computing resources 120 is a guaranteed reservation such that the cloud computing resources 120 are guaranteed to be available at the reserved time and for the duration of the reservation. The reserved cloud computing resources 120 are guaranteed resources for virtualized instances.

In some embodiments, the scheduling server 140 reserves resources for multiple enterprises. For example, the scheduling server 140 of a Police department reserves resources for the responding officers of the fire department and the emergency medical services department that are also responding to the incident. In these embodiments, the consuming communication devices 160 belong to a plurality of enterprises 110 (for example, police, fire, and emergency medical services departments) that are tasked with responding to the incident. Specifically, the scheduling server 140 associated with a first enterprise also makes cloud computing resource 120 reservations for a second enterprise and/or a third enterprise. In other embodiments, each enterprise 110 may handle its own reservations. In these embodiments, the electronic processor 210 detects changes in the incident resulting in increase or decrease of personnel at the incident from each of the enterprises 110. In certain embodiments, when this change is detected, the electronic processor 210 facilitates lending and borrowing of the cloud computing resources 120 between the enterprises to further improve the efficiency.

Once the incident has begun, the scheduling server 140 continues to monitor the incident to determine whether the demand for cloud computing resources 120 is changing. A new condition may be detected at a public safety incident which requires a specialized public safety team to be dispatched to the incident. For example, a hazardous substance may be detected at a fire incident resulting in a HAZMAT team being dispatched to the incident. This leads to an increase in demand of the cloud computing resources 120. The electronic processor 210 detects a change in the incident resulting in an increase of the cloud computing resources 120 for the incident. The change may be detected based on monitoring the event or based on receiving an input from an incident coordinator at the scheduling server 140.

Based on detecting the changes associated with the incident, the electronic processor 210 determines an amount of additional cloud computing resources 120 to be allocated for the incident. The electronic processor 210 determines the amount of additional cloud computing resources 120 based on the number of additional communication devices 160 newly assigned to the incident. The electronic processor 210 reserves the amount of additional cloud computing resources 120 for the incident. The electronic processor 210 requests additional reservations from the cloud services provider 130 for the time at which and for the duration the cloud computing resources 120 are needed.

In some embodiments, the electronic processor 210 detects a change in the incident resulting in a reduction of the cloud computing resources 120 for the incident. For example, a specialized public safety team may have completed a task resulting in the specialized team being dispatched away from the incident. Based on the decrease in demand, the electronic processor 210 determines an amount of excess cloud computing resources 120 reserved for the incident. The amount of excess cloud computing resources 120 depends on the number of communication devices 160 departing the incident scene after the associated public safety officers have completed their tasks. The electronic processor 210 releases the reservation of the amount of excess cloud computing resources 120 for the incident. This allows the organization to reduce the cost associated with reservation of excess cloud computing resources 120.

In some embodiments, the electronic processor 210 detects a change in location of the incident from a first location to a second location. For example, the incident may include a highway vehicle chase from the first location to the second location. Based on the change in the location, the electronic processor 210 determines the number of consuming communication devices moving from the first location to the second location. The electronic processor 210 detects this event and determines that the cloud computing resources 120 at the first location may no longer be needed and new cloud computing resources 120 may be needed at the second location. Based on this determination, the electronic processor 210 releases a first amount of cloud computing resources 120 at the first location corresponding to the number of consuming communications devices 160. Additionally, the electronic processor 210 reserves the first amount of cloud computing resources 120 at the second location corresponding to the number of consuming communications devices 160.

Figure 4:
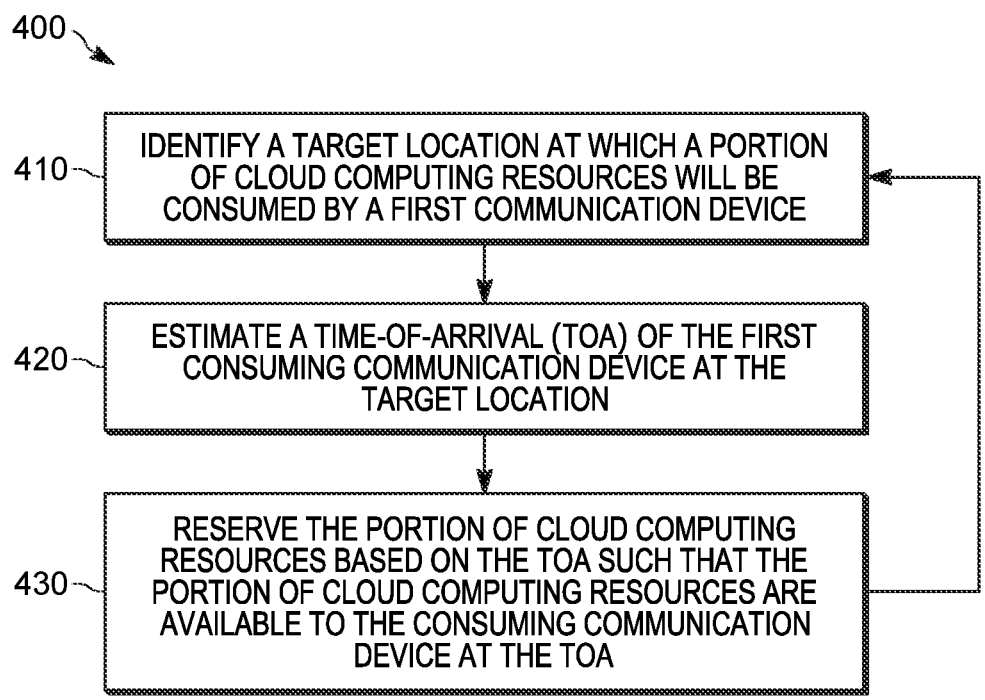
FIG. 4 is a flowchart of a method for scheduling resource reservations in the cloud-based communication system of FIG. 1 in accordance with some embodiments.

In some embodiments, the reservations are made for when a communication device 160 is scheduled to arrive at the incident scene. FIG. 4 is a flowchart of an example method 400 for scheduling resource reservation in the cloud-based communication system 100. In the example illustrated, the method 400 includes identifying, using the electronic processor 210, a target location at which a portion of cloud computing resources 120 will be consumed by a first consuming communication device 160 (at block 410). The portion of the cloud computing resources 120 are used by the first consuming communication device 160 during the incident. In some embodiments, the target location is the incident scene. In other embodiments, the target location is a support location where supporting personnel are to be located for responding to the incident.

The method 400 includes estimating, using the electronic processor 210, a time-of-arrival (TOA) of the first consuming communication device 160 at the target location (at block 420). The electronic processor 210 determines the current location of the first consuming communication device 160. The current location can be determined based on a signal received from the first consuming communication device 160 at the electronic processor 210. The TOA is estimated using the current location of the first consuming communication device 160 and the target location. In some embodiments, the electronic processor 210 determines the time-of-arrival based on additional information. The additional information includes, for example, traffic on the route between the current location and the target location, amount of time for the responding officer to complete a task at a current location, and the like.

The method 400 includes reserving, using the electronic processor 210, the portion of the cloud computing resources 120 based on the TOA such that the portion of the cloud computing resources 120 are available to the first consuming communication device 160 at the TOA (at block 430). The reservation of the cloud computing resources 120 is made for the TOA and for the duration as desired for responding to the incident. The scheduling server 140 communicates with the cloud services provider 130 to make the reservations at the TOA.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A scheduling server for scheduling resource reservation in a cloud-based communication system, the scheduling server comprising:
   an electronic processor configured to
      monitor events during occurrence of a public safety incident outside of the cloud-based communication system;
      determine cloud computing resources to be allocated to consuming communication devices assigned to respond to the public safety incident; and
      reserve the cloud computing resources such that the cloud computing resources are available to the consuming communication devices for responding to the public safety incident, wherein the reservations of the cloud computing resources are made for an arrival time of the consuming communication devices at an incident scene of the public safety incident, wherein the reserved cloud computing resources are guaranteed resources for virtualized instances.

2. The scheduling server of claim 1, wherein the virtualized instances include at least one selected from a group consisting of virtual machines, docker containers, and Kubernetes pods.

3. A scheduling server for scheduling resource reservation in a cloud-based communication system, the scheduling server comprising:
   an electronic processor configured to
      monitor events during occurrence of a public safety incident outside of the cloud-based communication system;
      determine cloud computing resources to be allocated to consuming communication devices assigned to respond to the public safety incident;
      reserve the cloud computing resources such that the cloud computing resources are available to the consuming communication devices for responding to the public safety incident, wherein the reservations of the cloud computing resources are made for an arrival time of the consuming communication devices at an incident scene of the public safety incident;
      detect a change in the public safety incident resulting in a reduction of the cloud computing resources for the public safety incident;
      determine an amount of excess cloud computing resources reserved for the public safety incident; and
      release reservation of the amount of excess cloud computing resources for the public safety incident.

4. A scheduling server for scheduling resource reservation in a cloud-based communication system, the scheduling server comprising:
   an electronic processor configured to
      monitor events during occurrence of a public safety incident outside of the cloud-based communication system;
      determine cloud computing resources to be allocated to consuming communication devices assigned to respond to the public safety incident;
      reserve the cloud computing resources such that the cloud computing resources are available to the consuming communication devices for responding to the public safety incident, wherein the reservations of the cloud computing resources are made for an arrival time of the consuming communication devices at an incident scene of the public safety incident;
      detect a change in the public safety incident resulting in an increase of the cloud computing resources for the public safety incident;
      determine an amount of additional cloud computing resources to be allocated for the public safety incident; and
      reserve the amount of additional cloud computing resources for the public safety incident.

5. The scheduling server of claim 1, wherein the electronic processor is further configured to
   identify a target location at which a portion of the cloud computing resources will be consumed by a first consuming communication device of the consuming communication devices, the portion of the cloud computing resources used by the first consuming communication device during the public safety incident;
   estimate a time-of-arrival (TOA) of the first consuming communication device at the target location; and
   reserve the portion of the cloud computing resources based on the TOA such that the portion of the cloud computing resources are available to the first consuming communication device at the TOA.

6. The scheduling server of claim 5, further comprising:
   determining a current location of the first consuming communication device, and wherein the TOA is estimated using the current location of the first consuming communication device and the target location.

7. A scheduling server for scheduling resource reservation in a cloud-based communication system, the scheduling server comprising:
   an electronic processor configured to
      monitor events during occurrence of a public safety incident outside of the cloud-based communication system;

determine cloud computing resources to be allocated to consuming communication devices assigned to respond to the public safety incident;

reserve the cloud computing resources such that the cloud computing resources are available to the consuming communication devices for responding to the public safety incident, wherein the reservations of the cloud computing resources are made for an arrival time of the consuming communication devices at an incident scene of the public safety incident, wherein the consuming communication devices belong to a plurality of enterprises tasked with responding to the public safety incident.

8. A scheduling server for scheduling resource reservation in a cloud-based communication system, the scheduling server comprising:

an electronic processor configured to monitor events during occurrence of a public safety incident outside of the cloud-based communication system;

determine cloud computing resources to be allocated to consuming communication devices assigned to respond to the public safety incident;

reserve the cloud computing resources such that the cloud computing resources are available to the consuming communication devices for responding to the public safety incident, wherein the reservations of the cloud computing resources are made for an arrival time of the consuming communication devices at an incident scene of the public safety incident;

detect a change in a location of the public safety incident from a first location to a second location;

determine a number of the consuming communication devices moving from the first location to the second location based on the change in the location;

release a first amount of cloud computing resources at the first location corresponding to the number of the consuming communication devices; and reserve the first amount of cloud computing resources at the second location corresponding to the number of the consuming communication devices.

9. A method for scheduling resource reservation in a cloud-based communication system, the method comprising:

monitoring, using a scheduling server, events during occurrence of a public safety incident outside of the cloud-based communication system;

determining, using the scheduling server, cloud computing resources to be allocated to consuming communication devices assigned to respond to the public safety incident; and reserving, using the scheduling server, the cloud computing resources such that the cloud computing resources are available to the consuming communication devices for responding to the public safety incident, wherein the reservations of the cloud computing resources are made for an arrival time of the consuming communication devices at an incident scene of the public safety incident, wherein the reserved cloud computing resources are guaranteed resources for virtualized instances.

10. The method of claim 9, further comprising:

identifying, using the scheduling server, a target location at which a portion of the cloud computing resources will be consumed by a first consuming communication device of the consuming communication devices, the portion of the cloud computing resources used by the first consuming communication device during the public safety incident;

estimating, using the scheduling server, a time-of-arrival (TOA) of the first consuming communication device at the target location; and reserving, using the scheduling server, the portion of the cloud computing resources based on the TOA such that the portion of the cloud computing resources are available to the first consuming communication device at the TOA.

11. The method of claim 10, further comprising:

determining a current location of the first consuming communication device, and wherein the TOA is estimated using the current location of the first consuming communication device and the target location.

12. A method for scheduling resource reservation in a cloud-based communication system, the method comprising:

monitoring, using a scheduling server, events during occurrence of a public safety incident outside of the cloud-based communication system;

determining, using the scheduling server, cloud computing resources to be allocated to consuming communication devices assigned to respond to the public safety incident; and reserving, using the scheduling server, the cloud computing resources such that the cloud computing resources are available to the consuming communication devices for responding to the public safety incident, wherein the reservations of the cloud computing resources are made for an arrival time of the consuming communication devices at an incident scene of the public safety incident, wherein the virtualized instances include at least one selected from a group consisting of virtual machines, docker containers, and Kubernetes pods.

13. A method for scheduling resource reservation in a cloud-based communication system, the method comprising:

monitoring, using a scheduling server, events during occurrence of a public safety incident outside of the cloud-based communication system;

determining, using the scheduling server, cloud computing resources to be allocated to consuming communication devices assigned to respond to the public safety incident;

reserving, using the scheduling server, the cloud computing resources such that the cloud computing resources are available to the consuming communication devices for responding to the public safety incident, wherein the reservations of the cloud computing resources are made for an arrival time of the consuming communication devices at an incident scene of the public safety incident;

detecting a change in the public safety incident resulting in a reduction of the cloud computing resources for the public safety incident;

determining an amount of excess cloud computing resources reserved for the public safety incident; and releasing reservation of the amount of excess cloud computing resources for the public safety incident.

14. A method for scheduling resource reservation in a cloud-based communication system, the method comprising:

monitoring, using a scheduling server, events during occurrence of a public safety incident outside of the cloud-based communication system;

determining, using the scheduling server, cloud computing resources to be allocated to consuming communication devices assigned to respond to the public safety incident;

reserving, using the scheduling server, the cloud computing resources such that the cloud computing resources are available to the consuming communication devices for responding to the public safety incident, wherein the reservations of the cloud computing resources are made for an arrival time of the consuming communication devices at an incident scene of the public safety incident;

detecting a change in the public safety incident resulting in an increase of the cloud computing resources for the public safety incident;

determining an amount of additional cloud computing resources to be allocated for the public safety incident; and reserving the amount of additional cloud computing resources for the public safety incident.

15. A method for scheduling resource reservation in a cloud-based communication system, the method comprising:

monitoring, using a scheduling server, events during occurrence of a public safety incident outside of the cloud-based communication system;

determining, using the scheduling server, cloud computing resources to be allocated to consuming communication devices assigned to respond to the public safety incident; and reserving, using the scheduling server, the cloud computing resources such that the cloud computing resources are available to the consuming communication devices for responding to the public safety incident, wherein the reservations of the cloud computing resources are made for an arrival time of the consuming communication devices at an incident scene of the public safety incident, wherein the consuming communication devices belong to a plurality of enterprises tasked with responding to the public safety incident.

16. A method for scheduling resource reservation in a cloud-based communication system, the method comprising:

monitoring, using a scheduling server, events during occurrence of a public safety incident outside of the cloud-based communication system;

determining, using the scheduling server, cloud computing resources to be allocated to consuming communication devices assigned to respond to the public safety incident;

reserving, using the scheduling server, the cloud computing resources such that the cloud computing resources are available to the consuming communication devices for responding to the public safety incident, wherein the reservations of the cloud computing resources are made for an arrival time of the consuming communication devices at an incident scene of the public safety incident;

detecting, using the scheduling server, a change in a location of the public safety incident from a first location to a second location;

determining, using the scheduling server, a number of the consuming communication devices moving from the first location to the second location based on the change in the location;

releasing, using the scheduling server, a first amount of cloud computing resources at the first location corresponding to the number of the consuming communication devices; and reserving, using the scheduling server, the first amount of cloud computing resources at the second location corresponding to the number of the consuming communication devices.

* * * * *